United States Patent
Tollett et al.

(10) Patent No.: US 6,383,068 B1
(45) Date of Patent: May 7, 2002

(54) FOOD PORTIONING APPARATUS AND METHOD

(75) Inventors: Leland Edward Tollett; Stanley Bryan Andrews; Mark Henry Curry; Johnny Simpson Breeden, all of Rogers; Donald Mark Zimmerman, Springdale, all of AR (US)

(73) Assignee: Tyson Foods, Inc., Springdale, AR (US)

( * ) Notice: Subject to any disclaimer, the term of this patent is extended or adjusted under 35 U.S.C. 154(b) by 0 days.

(21) Appl. No.: 09/057,808

(22) Filed: Apr. 9, 1998

(51) Int. Cl.[7] .......................... A22C 17/02; A22C 21/00
(52) U.S. Cl. ........................................ 452/170; 452/149
(58) Field of Search ................................. 452/170, 149, 452/194, 154

(56) References Cited

U.S. PATENT DOCUMENTS

| | | | |
|---|---|---|---|
| 4,700,899 A | * 10/1987 | Powers et al. | |
| 4,780,931 A | * 11/1988 | Powers et al. | |
| 4,868,951 A | * 9/1989 | Akesson et al. | 452/155 |
| 4,905,348 A | * 3/1990 | Powers et al. | |
| 4,941,379 A | * 7/1990 | Gasbaro | |
| 5,286,230 A | * 2/1994 | Nienstedt et al. | 452/170 |
| 5,364,301 A | * 11/1994 | Kestner et al. | 452/170 |
| 5,370,573 A | * 12/1994 | Warren et al. | 452/170 |
| 5,391,109 A | * 2/1995 | Warden | 452/170 |
| 5,458,535 A | * 10/1995 | Buccock et al. | 452/170 |
| 5,569,070 A | * 10/1996 | Smith | |

* cited by examiner

Primary Examiner—Willis Little
(74) Attorney, Agent, or Firm—Fellers, Snider, Blankenship, Bailey & Tippens

(57) ABSTRACT

An apparatus and method for portioning food items. The inventive apparatus preferably comprises: a carrier structure having a cavity provided therein for receiving a first portion of a food item; a holding device for imparting a force to the food item sufficient to hold the first portion of the food item in the cavity; and a saw or knife having a blade receivable between the carrier structure and the holding structure for cutting the food item into the first portion and a second portion. The holding structure is preferably an upper belt-type conveyor and the apparatus most preferably comprises a series of carrier plates conveyed by a lower conveyor system. Alternatively, the holding structure can be replaced with a vacuum system for generating a vacuum in the plate cavities. The inventive method comprises the steps of: (a) placing a first portion of a food item in a cavity provided in a holding structure; (b) pressing the food item, using a pressing structure, with a force sufficient to hold the first portion in the cavity; and (c) while pressing the food item, receiving a cutting structure between the holding structure and the pressing structure such that the cutting structure cuts the food item into the first portion and a second portion. In an alternative embodiment of the inventive method, the first portion of the food item is held by generating a vacuum in the cavity.

30 Claims, 8 Drawing Sheets

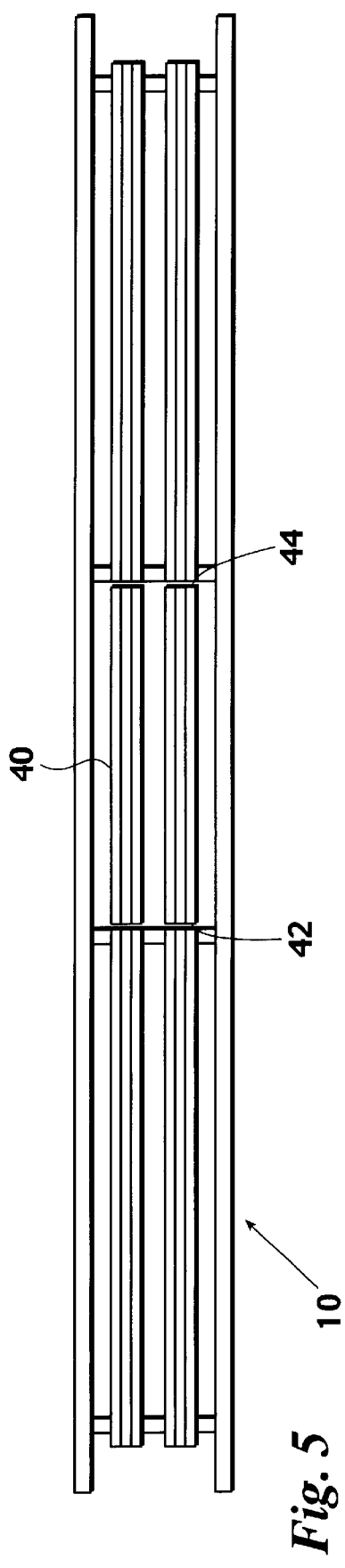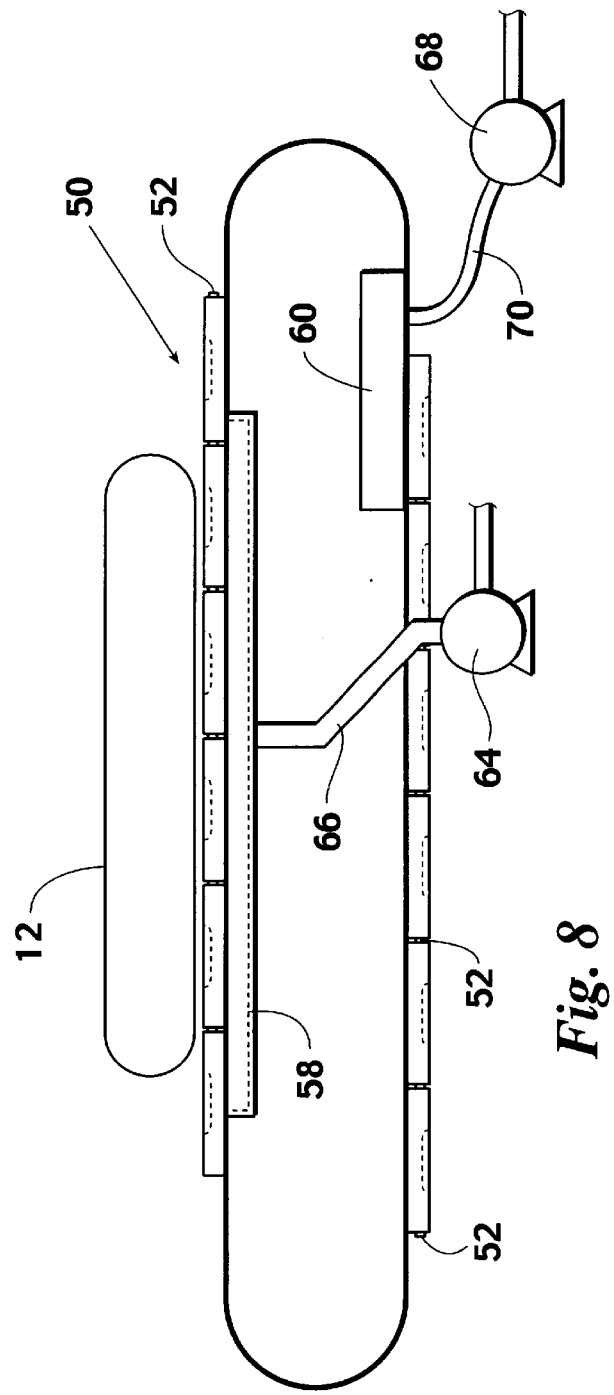

FOOD PORTIONING APPARATUS AND METHOD

FIELD OF THE INVENTION

The present invention relates to apparatuses and methods for portioning food items. More particularly, but not by way of limitation, the present invention relates to apparatuses and methods for portioning poultry breast items.

BACKGROUND OF THE INVENTION

A need presently exists for a fast and economical system for portioning poultry breast fillets, as well as other food items, to provide products having highly uniform shapes and sizes. The provision of highly uniform meat and poultry items allows the use of very standardized cooking and handling procedures and thus greatly enhances product safety as well as product consistency, quality, and appearance.

Heretofore, hand trimming techniques have commonly been used in an attempt to provide some uniform poultry breast fillet products. Unfortunately, hand trimming techniques are extremely labor intensive and are therefore typically quite slow and costly. Moreover, although many hand trimmers are quite skilled, hand trimming techniques are, by no means, highly precise. Thus, the products produced by these techniques typically are not as uniform as would be desired.

U.S. Pat. No. 4,941,379 discloses an apparatus for producing size-controlled portions of meat. The apparatus comprises a plurality of mandrels attached to a chain for continuous movement along a predetermined path. Each mandrel includes a squeezable pocket in which a boneless poultry breast fillet is received. With the pocket in vertical position and with the poultry breast placed therein, the mandrel moves past a vibrating assembly which shakes the meat into proper position in the pocket. Next, the mandrel moves past a water knife and blade assembly which removes any excess end portion of the meat protruding from the top of the pocket. As the mandrel moves past the cutting assembly, the pocket contacts and is squeezed by a pair of stationary contact members. The squeezing of the pocket is intended to further enhance the uniformity of the product produced by the apparatus.

Although the products produced by the apparatus of U.S. Pat. No. 4,941,379 may be somewhat uniform with respect to weight and, perhaps, length, the products are not uniform with respect to other critical features. For example, the U.S. Pat. No. 4,941,379 apparatus does little, if anything, to ensure the attainment of a uniform thickness profile. The squeezing force applied to the mandrel pocket is clearly not sufficient to permanently compress the breast product. Moreover, even if sufficient pressure were applied to permanently compress the product, the degree of retention of the compressed profile would vary substantially among the individual products produced. The attainment of a permanent, uniform thickness profile is critical to the implementation of standardized cooking procedures, The U.S. Pat. No. 4,491,379 apparatus also does not provide highly uniform widths and shapes.

U.S. Pat, No. 5,569,070 discloses an apparatus for portioning a cut of whole muscle meat into a product having margins of selected size. The apparatus comprises: a turntable assembly; a plurality of lower platens secured to the turntable assembly; and an upper die. Chicken breasts fillets are placed on the lower platens and the platens are then sequentially rotated by the turntable into position beneath the upper die. The upper die stamps and compresses the chicken breast items against the lower platens. The upper die includes a shaped blade which removes excess material from the perimeter of the breast portion and is thus intended to provide a uniform length and width. It is also intended that the compressive force of the upper die impart a substantially uniform, compressed thickness profile.

Unfortunately, the degree to which the individual products produced by the U.S. Pat. No. 5,569,070 apparatus retain the compressed profile will vary significantly. Thus, the thickness profiles of products will not be highly uniform. Further, the extreme compressive force applied to the breast portions can alter the tissue characteristics of the products and therefore adversely affect the quality of the product. Moreover, stamping machines of the type disclosed in U.S. Pat. No. 5,569,070 typically produce a tremendous amount of noise.

SUMMARY OF THE INVENTION

The present invention provides a portioning apparatus and a portioning method which resolve the problems and satisfy the needs mentioned above. The inventive apparatus and method are quick and economical and provide highly uniform, high quality products which have a very desirable look, feel, and texture.

In one aspect, the present invention provides an apparatus for portioning food items comprising: retaining means for retaining at least one food item; imparting means for imparting a force to the food item sufficient to hold the food item against the retaining means; and cutting means, receivable between the retaining means and the imparting means, for cutting the food item into at least a first portion and a second portion.

In another aspect, the present invention provides an apparatus for portioning food items comprising: retaining means for retaining at least one food item, the retaining means having at least one cavity provided therein for receiving a first portion of the food item; vacuum means for creating a vacuum in the cavity sufficient to hold the first portion in the cavity; and cutting means for cutting the food item into at least the first portion and a second portion.

In another aspect, the present invention provides a method of portioning food items. The method comprises the steps of: (a) placing a first portion of a food item in a cavity provided in a holding structure; (b) pressing the food item, using a pressing structure, with a force sufficient to hold the first portion in the cavity; and (c) while pressing the food item, receiving a cutting structure between the holding structure and the pressing structure such that the cutting structure cuts the food item into at least the first portion and a second portion.

In another aspect, the present invention provides a method of portioning food items comprising the steps of: (a) continuously conveying the food items into engagement with a cutting structure, the food items being conveyed by a series of cavities such that each of the food items has a first portion positioned in a separate one of the cavities; (b) pressing the food items, using a pressing structure, with a force sufficient to hold the first portions in the cavities; and (c) while pressing the food items, receiving the cutting structure between the cavities and the pressing structure such that the cutting structure cuts each of the food items into at least the first portion and a second portion.

In yet another aspect, the present invention provides a method of portioning food items comprising the steps of: (a) placing the first portion of a food item in a cavity provided in a holding structure; (b) creating a vacuum in the cavity sufficient to hold the first portion in the cavity; and (c) while holding the first portion in the cavity using the vacuum, cutting the food item into at least the first portion and a second portion.

Further objects, features, and advantages of the present invention will be apparent upon examining the accompanying drawings and upon reading the following description of the preferred embodiments.

BRIEF DESCRIPTION OF THE DRAWINGS

FIG. 5 provides a plan view of a support track 10 used in the inventive apparatus.

In FIG. 6, device 90 is shown in nonactivated position.

FIG. 8 schematically illustrates an alternative embodiment 50 of the inventive portioning apparatus.

DESCRIPTION OF THE PREFERRED EMBODIMENTS

Figure 1:
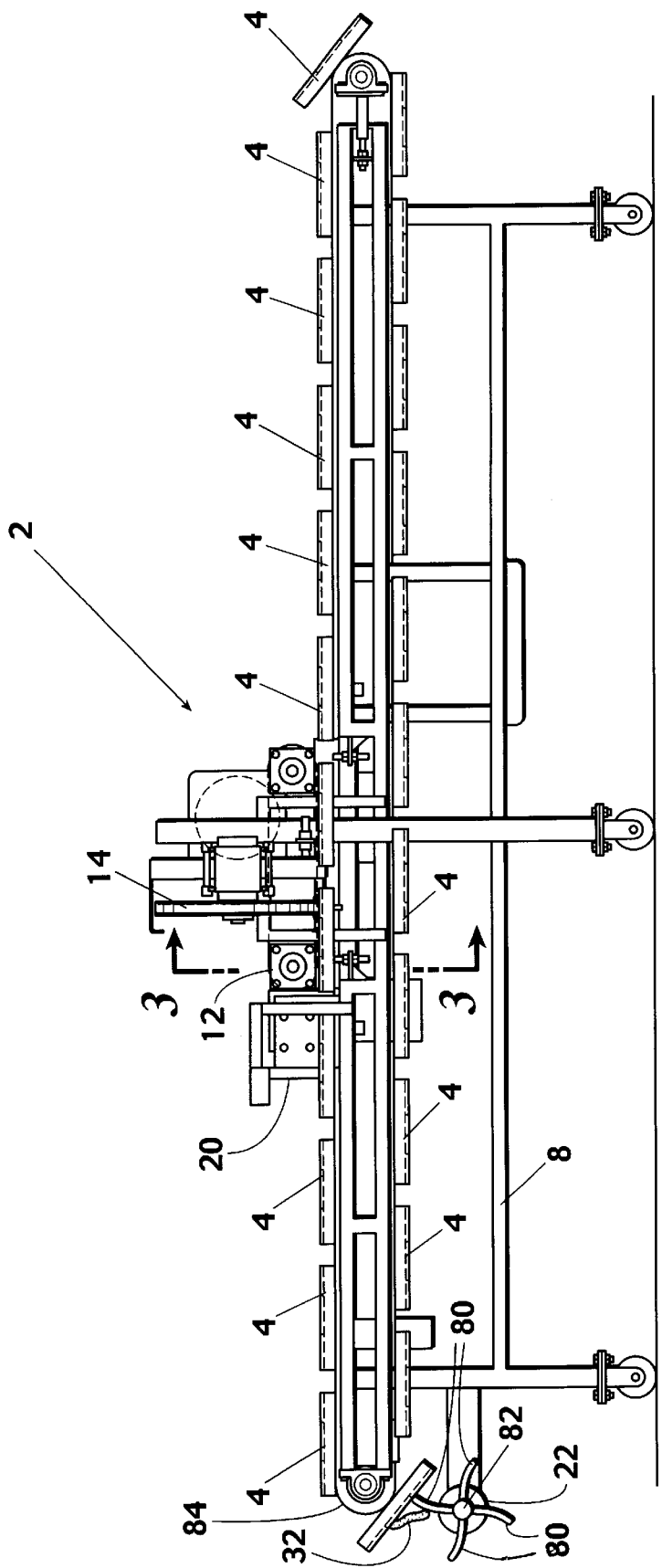
FIG. 1 provides an elevational side view of an embodiment 2 of the inventive portioning apparatus.
Figure 2:
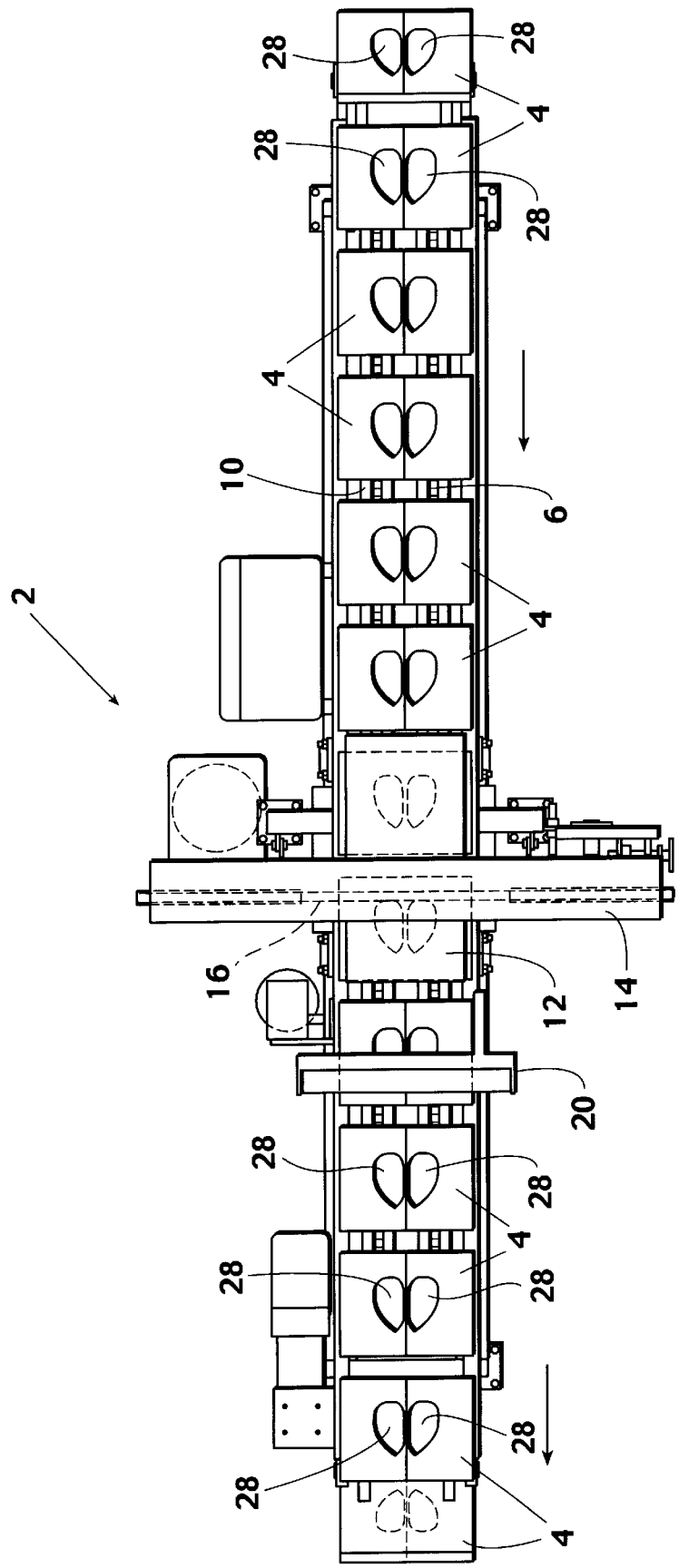
FIG. 2 provides a plan view of inventive apparatus 2.
Figure 3:
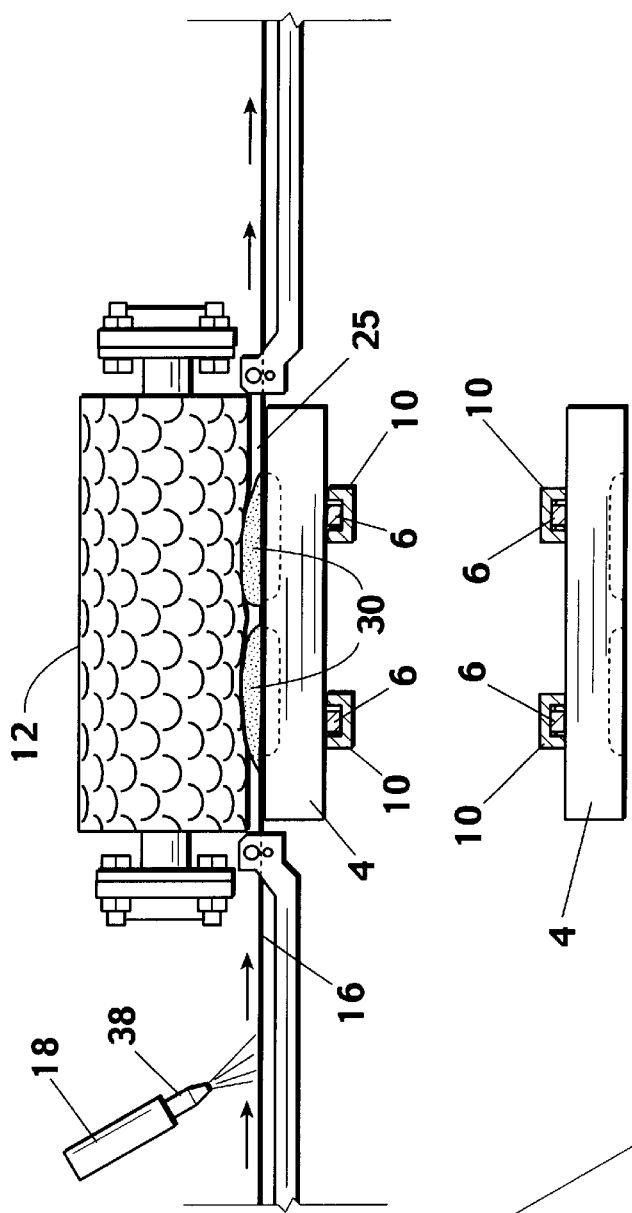
FIG. 3 provides a simplified, cutaway, end view of inventive apparatus 2 as seen from perspective 3—3 shown in FIG. 1.

An embodiment 2 of the inventive portioning apparatus is depicted in FIGS. 1–3. Inventive apparatus 2 comprises: a series of plates or other carrying structures 4; a continuous conveyor (e.g., a chain-type conveyor) 6 to which carrying plates 4 are attached; a base frame 8 on which conveyor 6 is operably mounted; a support track 10 over which plates 4 are conveyed and upon which plates 4 are supported; a liftable, continuous, upper belt-type conveyor 12 which moves in synchronization with lower conveyor 6 and with plates 4; a cutting device 14 having a cutting structure 16 positioned between plates 4 and upper conveyor 12; a blade wetting system 18; a plate scrapping device 20; and a finger-type grasping system 22 for removing product from plates 4.

Figure 4:
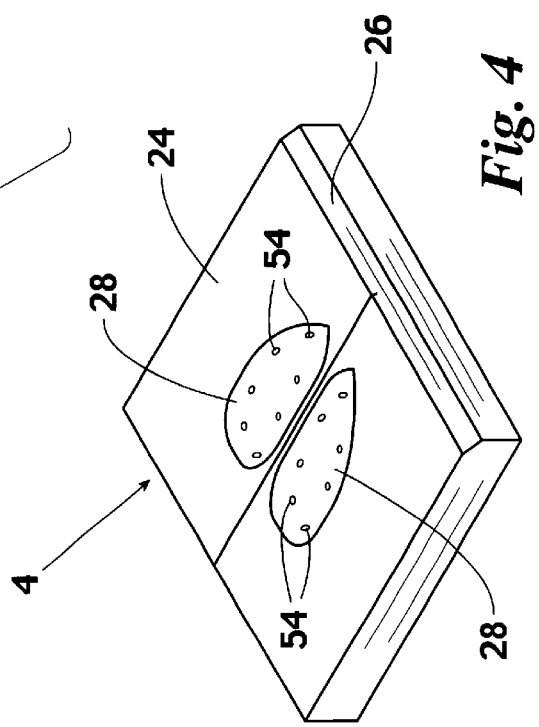
FIG. 4 provides a perspective view of a carrying plate 4 used in the inventive apparatus.

A plate 4 of the type preferred for use in apparatus 2 is depicted in FIG. 4. Plate 4 preferably includes: a flat upper surface 24; a beveled leading edge 26; and one or two cavities 28 formed in upper surface 24. Depending on the particular food product to be produced, cavities 28 can generally be of any desired size and shape. In this embodiment, the size and shape of each cavity 28 corresponds to the size and shape of a desired poultry breast fillet product. A groove 27 can optionally be provided down the center of plate 4 to allow and facilitate cutting the food item in half using, e.g., a vertical saw.

Figure 6:
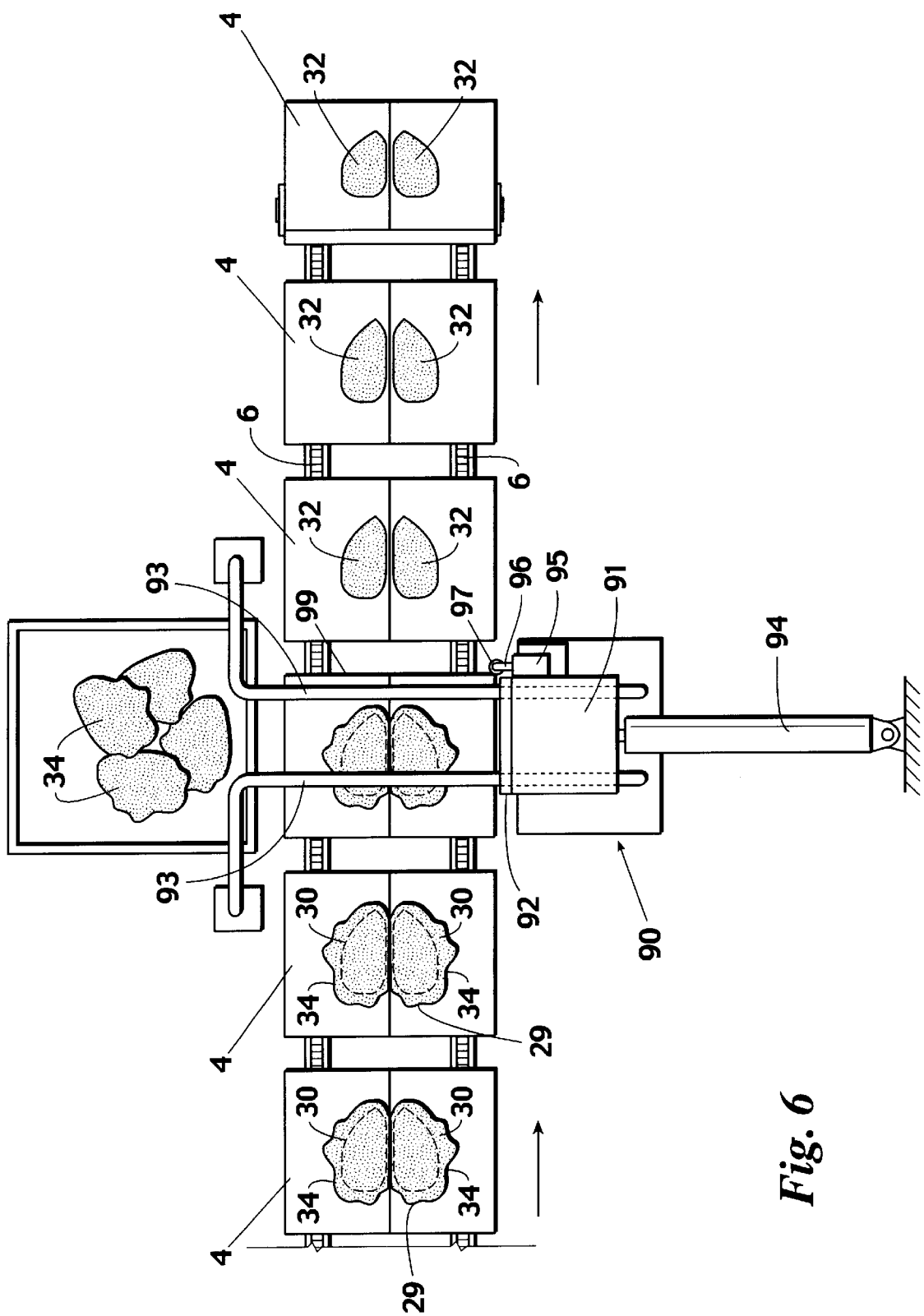
FIG. 6 provides a plan view of an embodiment 90 of a plate scraping device used in the inventive apparatus.
Figure 7:
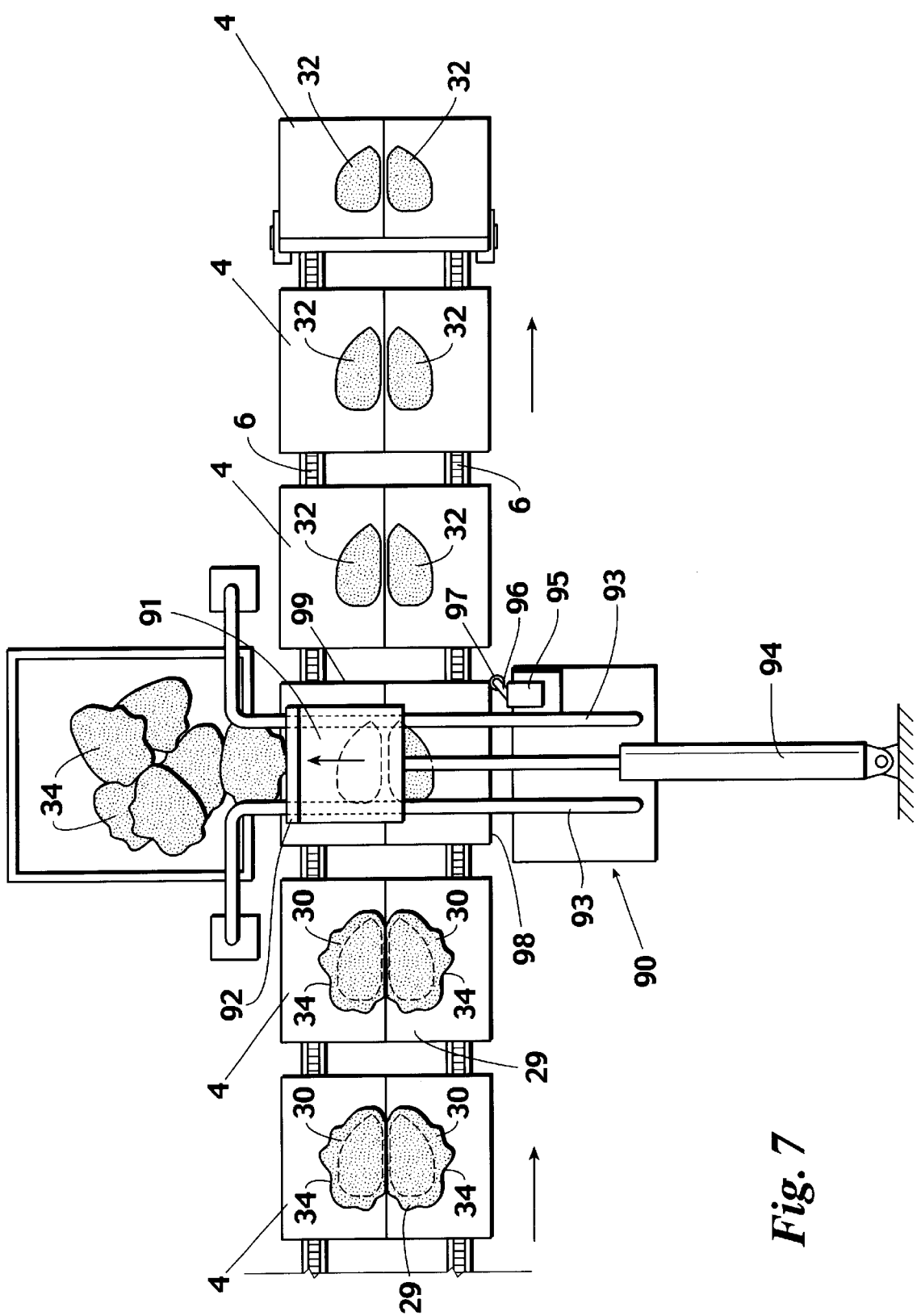
FIG. 7 provides a second plan view of plate scraping device 90 showing device 90 in activated position.

As shown in FIGS. 6 and 7, a whole muscle, poultry breast fillet lobe 30 can be placed on plate 4 over each cavity 28 such that a portion 32 of the lobe 30 is received in the cavity 28. If desired, a plurality of cavities 28 can be provided across plate 4 for providing multiple processing lanes through apparatus 2. The cavities 28 provided in plates 4 of embodiment 2 are shaped and positioned to receive an entire breast fillet butterfly 29 such that a separate, uniform fillet portion 32 can be cut from each of the two lobes 30 of butterfly 29. The remaining portion 34 of the lobe 30 or butterfly 29 is positioned above cavity 28 and overlaps onto the upper surface 24 of plate 4.

Upper conveyor 12 is positionable above carrying plates 4 such that upper conveyor 12 is spaced apart from plates 4 but applies sufficient force to food items 29, 30 to hold the portions 32 thereof in plate cavities 28. Of course, the gap 25 between upper conveyor 12 and plates 4 must be sufficient for receiving cutting structure 16.

The present invention need not, and preferably does not, rely on the retention of a compressed profile to maintain a desired product thickness. With breast lobe(s) 30 positioned on plates 4 in the manner depicted in FIGS. 3, 6, and 7, plate conveyor 6 and upper conveyor 12 carry breast lobes 30 into engagement with cutting structure 16. Cutting structure 16 is preferably received across upper plate surfaces 24 such that cutting structure 16 separates (i.e., cuts) breast portions 32 from the remaining portions 34 of the lobes. Upper conveyor 12 applies sufficient force to lobes 30 to hold breast portions 32 in cavities 28 during the cutting operation. If desired, upper conveyor 12 can be used to apply a substantial compressive force to food items 29, 30. However, upper conveyor 12 preferably does not significantly compress breast portions 32 and, thus, the product portions 32 have a uniform, noncompressed size and shape which is substantially equivalent to the size and shape of cavities 28.

Cutting device 14 is preferably secured to frame 8 in fixed position such that cutting structure 16 extends between plates 4 and upper conveyor 12. Cutting device 14 is preferably a band saw with cutting structure 16 being a band saw blade. Alternatively, a reciprocating blade or other cutting device could be used.

Band saw blade 16 runs continuously through gap 25. To prevent blade 16 from pulling and/or feathering the product, blade wetting system 18 operates to continuously apply fluid (preferably water) to blade 16. Wetting system 18 preferably comprises a spray nozzle 38.

Figure 9:
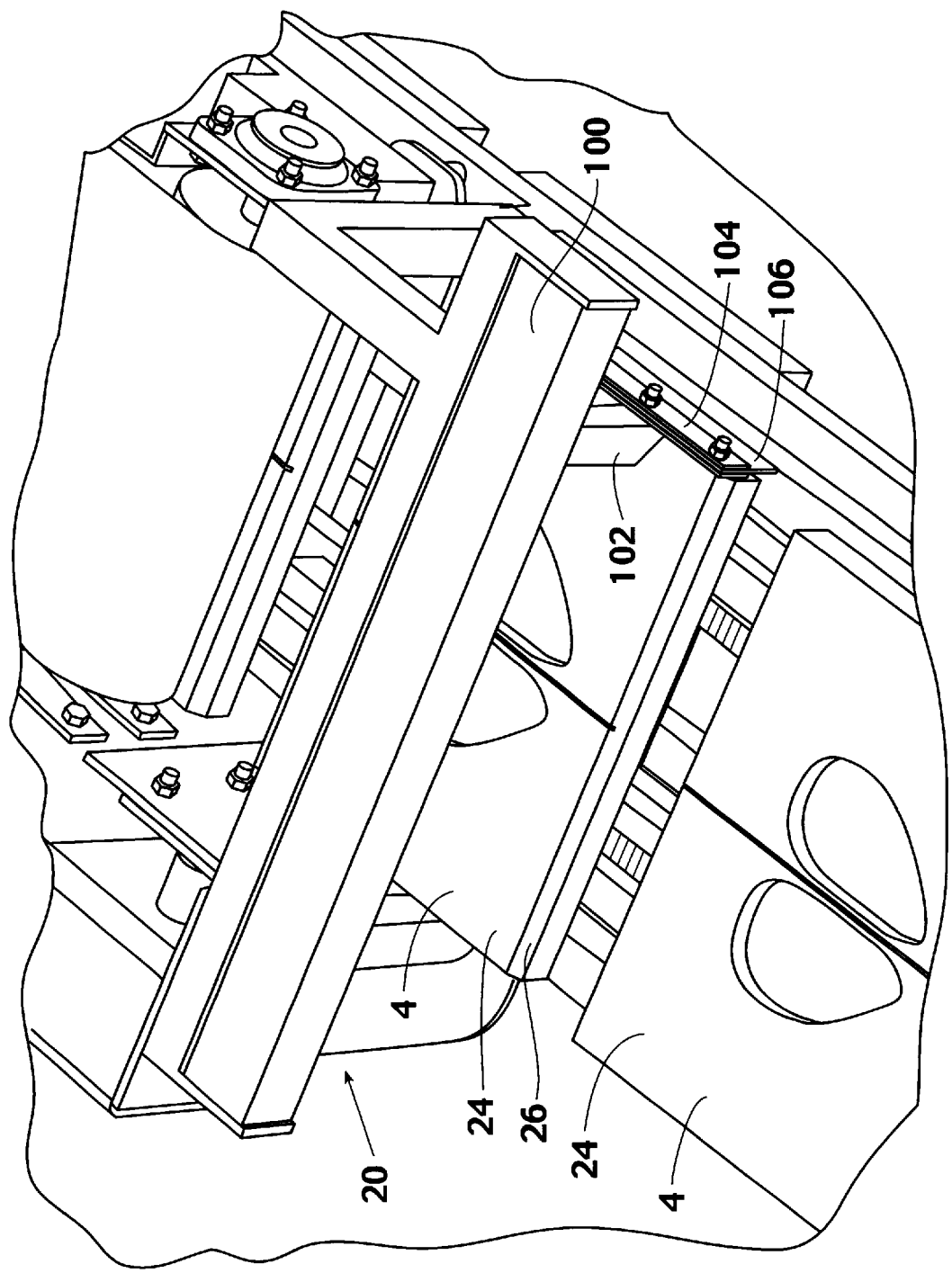
FIG. 9 provides an upper perspective view of a scraping device 20 used in the inventive apparatus.
Figure 10:
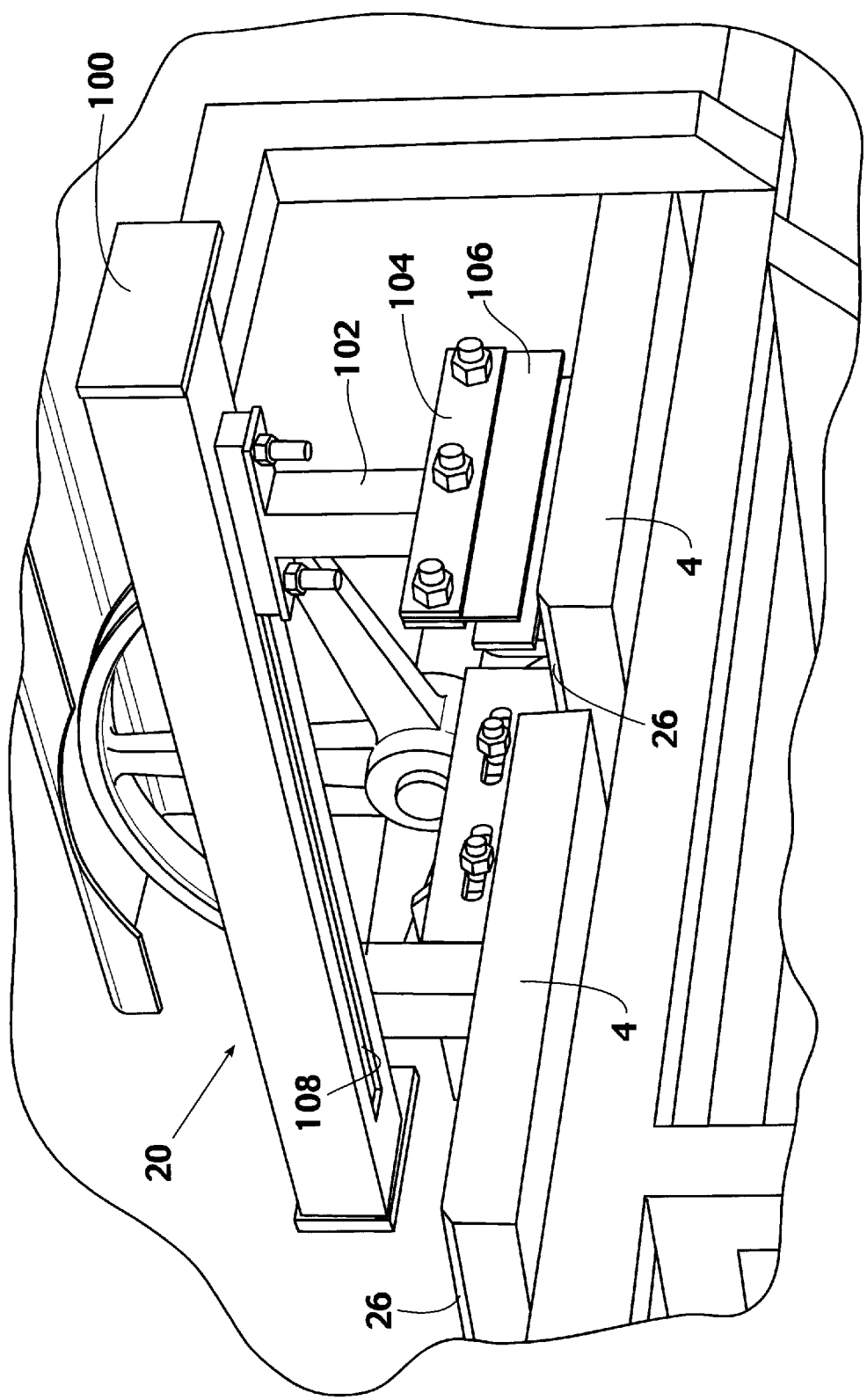
FIG. 10 provides a lower perspective view of scraping device 20.

Plate scraping device 20 operates to automatically push upper breast portions 34 off of the sides of plates 4 while leaving product portions 32 in cavities 28. Device 20 preferably pushes portions 34 either into a stationary container or onto another conveyor. As seen in FIGS. 9 and 10, plate scraping device 20 comprises: a transversely mounted rodless air cylinder 100, having a slot 108 formed in the bottom thereof, which extends substantially across the width of plate conveyor 6; a vertical support 102 secured to and extending from the plunger of rodless cylinder 100; an elongate, horizontal scraper brace 104 secured to the bottom of vertical support 102; and an elongate flexible scraper 106 secured in brace 104. As will be understood by those skilled in the art, air pressure is alternately applied to the two ends of the cylinder plunger whereby the scraper 106 is caused to move back and forth, transversely, across the upper surfaces 24 of plates 4.

Product grasping mechanism 22 comprises a plurality of flexible fingers 80 extending radially from a rotatably mounted support rod 82. Rod 82 is positioned below, and extends transversely to, the downstream return curve 84 of plate conveyor 6. Rod 82 is driven in a rotational direction opposite that of plate conveyor 6 such that, as plates 4 travel around return curve 84, flexible fingers 80 reach into, and peel product portions 32 out of, cavities 28.

An alternative embodiment 90 of the scraping device used in the inventive apparatus is depicted in FIGS. 6 and 7. Scraping device 90 comprises: a scraping block 91 having a forward scraping edge 92; a parallel pair of guide rods 93 on which scraping block 91 is slidably mounted, rods 93 being positioned above and extending transversely to plate conveyor 6; a ram 94 for pushing and pulling scraping block 91 along rods 93; and a switch 95 for activating ram 94. Switch 95 includes a switch arm 96 having a roller 97 rotatably mounted in the distal end thereof. As a plate 4 moves past scraping device 90, the leading edge 99 of the plate 4 contacts roller 97 and pushes switch arm 96 to the activated position shown in FIG. 7. When thus activated, ram 94 pushes scraping block 91 forward such that scraping edge 92 pushes upper breast portion 34 off of plate 4 but leaves product portions 32 in cavities 28. The ram then automatically pulls scraping block 91 back to its original position. As plate 4 continues forward, roller 97 rolls along the side edge 98 of plate 4. When plate 4 moves past switch 95, switch arm 96 automatically swings back to the waiting position shown in FIG. 6.

An identical switch system 95 can also be used for operating preferred scraping device 20.

Support track 10 is depicted in FIG. 5. As conveyor 6 moves plates 4 across support track 10, track 10 operates to properly align and position plates 4 for engagement with blade 16. Support track 10 also supports plates 4 against the holding force imparted to plates 4 by upper conveyor 12. Support track 10 preferably includes an independent, adjustable platform section 40 having a forward end 42 and a rearward end 44. Each of ends 42 and 44 is preferably independently vertically adjustable by manual, hydraulic, or other common means. Platform section 40 is positioned with respect to cutting blade 16 such that, by adjusting the vertical positions of ends 42 and 44, the operator can ensure that blade 16 contacts and runs flat across the upper surfaces 24 of plates 4. The beveled leading edges 26 of plates 4 also assist in guiding blade 16 onto upper plate surfaces 24.

An alternative embodiment 50 of the inventive portioning apparatus is schematically illustrated in FIG. 8. Inventive apparatus 50 is substantially identical to inventive apparatus 2 except that (a) the carrying plates 4 used in apparatus 50 include a plurality of flow passageways 54 extending into plate cavities 28; (b) a vacuum manifold 58 is positioned beneath the path of plates 4 for creating a vacuum (via flow passageways 54) in cavities 28 as plates 4 pass beneath cutting structure 16; and (c) a wash manifold 60 is provided above the lower run of plates 4 for delivering a washing fluid through flow passages 54. Additionally, assuming that sufficient vacuum is created in plate cavities 28 to hold food items 29, 30 during the cutting operation, inventive apparatus 50 need not include an upper conveyor 12. Inventive apparatus 50 also includes: a vacuum pump 64; a vacuum hose or other conduit 66 extending from pump 64 to vacuum manifold 58; a wash fluid pump 68; and a conduit 70 for delivering wash fluid from pump 68 to wash manifold 60.

As indicated above, the vacuum system used in inventive apparatus 50 preferably creates a sufficient vacuum in plate cavities 28 to hold product portions 32 in cavities 28 during the cutting operation. To ensure the attainment of an adequate vacuum in plate cavities 28, flexible sealing strips 52 are preferably provided on the leading and/or trailing edges of plates 4. Strips 52 seal the gaps between plates 4.

After the product is removed from plates 4 of alternative embodiment 50, the wash fluid system delivers wash fluid via manifold 62 through flow passageways 54 and thereby cleans both passageways 54 and plate cavities 28. Additionally, if so desired, grasping mechanism 22 can be replaced in embodiment 50 with an air manifold (not shown) for removing the product from plate cavities 28 by blowing air through flow passageways 54.

As will be understood by those skilled in the art, the vacuum and washing systems used in apparatus 50 could be replaced with a rotary valve system having separate, flexible hoses extending to individual plates 4. As plates 4 pass beneath cutting structure 16, the rotary valve system would apply a vacuum to plate cavities 28. At some point along the plate return path, the rotary valve system would deliver wash fluid through plate passageways 54. The rotary valve system could optionally also supply positive air pressure at the product collection point in order to assist in removing the product 32 from plate cavities 28.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An apparatus for portioning food items comprising:
   retaining means for retaining at least one food item;
   imparting means for imparting a force to said food item sufficient to hold said food item against said retaining means; and
   cutting means, receivable between said retaining means and said imparting means, for cutting said food item into at least a first portion and a second portion,
   said retaining means including at least one cavity for receiving said first portion of said food item, and
   said retaining means including an outer surface into which said cavity is provided and said cutting means being operable for contacting said outer surface while cutting said food item.

2. The apparatus of claim 1 wherein said retaining means is operable for carrying said food item into engagement with said cutting means.

3. The apparatus of claim 1 wherein said cutting means is a band saw.

4. The apparatus of claim 1 wherein said cavity has a size and a shape and wherein said cutting means is operable for cutting said food item such that said first portion has a noncompressed size and a noncompressed shape which are substantially equivalent to said size and said shape of said cavity.

5. The apparatus of claim 1 wherein said cavity has a shape corresponding to that of a poultry breast fillet.

6. The apparatus of claim 1 wherein said retaining means includes a series of cavities for receiving the first portions of a plurality of said food items.

7. The apparatus of claim 6 wherein said retaining means comprises a plurality of plates having said cavities provided therein.

8. The apparatus of claim 6 wherein said imparting means is operable for holding said first portions of said food items in said cavities while said food items are cut by said cutting means.

9. An apparatus for portioning food items comprising:
   retaining means for retaining at least one food item, said retaining means having at least one cavity provided therein for receiving a first portion of said food item;

vacuum means for creating a vacuum in said cavity sufficient to hold said first portion in said cavity; and cutting means for cutting said food item into at least said first portion and a second portion.

10. The apparatus of claim 9 wherein said retaining means is operable for carrying said food item into engagement with said cutting means.

11. The apparatus of claim 9 wherein said cavity has a size and a shape and wherein said cutting means is operable for cutting said food item such that said first portion has a noncompressed size and a noncompressed shape which are substantially equivalent to said size and said shape of said cavity.

12. The apparatus of claim 9 wherein said cavity has a shape corresponding to that of a poultry breast fillet.

13. The apparatus of claim 9 wherein said retaining means includes a series of said cavities for receiving the first portions of a plurality of said food items and wherein said vacuum means is operable for holding said first portions in said cavities while said food items are cut by said cutting means.

14. The apparatus of claim 13 further comprising conveying means for continuously conveying said retaining means such that, when positioned in said cavities, said food items are continuously carried into engagement with said cutting means.

15. A method of portioning food items comprising the steps of:

(a) placing a first portion of a food item in a cavity provided in a holding structure;

(b) pressing said food item, using a pressing structure, with a force sufficient to hold said first portion in said cavity; and (c) while pressing said food item, receiving a cutting structure between said holding structure and said pressing structure such that said cutting structure cuts said food item into at least said first portion and a second portion, wherein said holding structure has an outer surface into which said cavity is formed and wherein, during step (c), said cutting structure contacts said surface.

16. The method of claim 15 wherein said food item is a whole muscle poultry breast item.

17. The method of claim 15 wherein said cavity has a size and a shape and wherein said cutting structure cuts said food item in step (c) such that said first portion has a noncompressed size and a noncompressed shape which are substantially equivalent to said size and said shape of said cavity.

18. The method of claim 15 wherein said cavity has a shape corresponding to that of a poultry breast fillet.

19. The method of claim 15 wherein said cutting structure is a band saw blade.

20. A method of portioning food items comprising the steps of:

(a) continuously conveying said food items into engagement with a cutting structure, said food items being conveyed by a series of cavities such that each of said food items has a first portion positioned in a separate one of said cavities;

(b) pressing said food items, using a pressing structure which moves in conjunction with said cavities, with a force sufficient to hold said first portions in said cavities; and (c) while pressing and conveying said food items, receiving said cutting structure between said cavities and said pressing structure such that said cutting structure cuts each of said food items into at least said first portion and a second portion.

21. The method of claim 20 wherein said cutting structure is a band saw blade.

22. The method of claim 20 wherein said food items are whole muscle, poultry breast items.

23. The method of claim 20 wherein said cavities have a size and a shape and wherein said cutting structure cuts said food items in step (c) such that said first portions have a noncompressed size and a noncompressed shape which are substantially equivalent to said size and said shape of said cavities.

24. The method of claim 20 wherein said cavities have a shape corresponding to that of a poultry breast fillet.

25. A method of portioning food items comprising the steps of:

(a) placing a first portion of a food item in a cavity provided in a holding structure;

(b) creating a vacuum in said cavity sufficient to hold said first portion in said cavity; and (c) while holding said first portion in said cavity using said vacuum, cutting said food item into at least said first portion and a second portion.

26. The method of claim 25 wherein said cavity has a size and a shape and wherein said food item is cut in step (c) such that said first portion has a noncompressed size and a noncompressed shape which are substantially equivalent to said size and said shape of said cavity.

27. The method of claim 25 wherein said cavity has a shape corresponding to that of a poultry breast fillet.

28. An apparatus for portioning food items comprising:

retaining means for retaining food items, each of said food items having a first portion and said retaining means including a series of cavities for receiving said first portions of said food items;

imparting means for imparting a force to said food items sufficient to hold said food items against said retaining means;

cutting means, receivable between said retaining means and said imparting means, for cutting each of said food items into at least said first portion and a second portion; and conveying means for continuously conveying said retaining means such that, when positioned in said cavities, said food items are continuously carried into engagement with said cutting means, said imparting means being operable for moving in conjunction with said conveying means.

29. The apparatus of claim 28 wherein said imparting means is a belt-type conveyor.

30. The method of claim 28 wherein said pressing structure is a belt-type conveyor.

* * * * *